United States Patent
Vayssiere

(10) Patent No.: US 7,437,509 B2
(45) Date of Patent: Oct. 14, 2008

(54) MOBILE ADAPTIVE CACHE

(75) Inventor: Julien J. P. Vayssiere, Red Hill (AU)

(73) Assignee: SAP AG, Walldorf (DE)

( * ) Notice: Subject to any disclaimer, the term of this patent is extended or adjusted under 35 U.S.C. 154(b) by 498 days.

(21) Appl. No.: 10/955,353

(22) Filed: Sep. 29, 2004

(65) Prior Publication Data
US 2006/0069715 A1 Mar. 30, 2006

(51) Int. Cl.
*G06F 12/00* (2006.01)
*G06F 15/16* (2006.01)

(52) U.S. Cl. .................. 711/118; 709/203; 709/227; 709/228

(58) Field of Classification Search ................ 711/118; 709/203, 227, 228
See application file for complete search history.

(56) References Cited

U.S. PATENT DOCUMENTS

| | | | |
|---|---|---|---|
| 6,988,139 B1 * | 1/2006 | Jervis et al. ................. 709/226 |
| 7,143,163 B1 * | 11/2006 | Bleichenbacher et al. ... 709/225 |
| 2001/0037325 A1 * | 11/2001 | Biderman et al. .............. 707/1 |
| 2002/0083430 A1 * | 6/2002 | Kusuda et al. .............. 717/174 |
| 2002/0138551 A1 | 9/2002 | Erickson |
| 2003/0002390 A1 * | 1/2003 | Sellen et al. .................. 368/12 |
| 2004/0015538 A1 | 1/2004 | Agarwalla et al. |
| 2005/0010677 A1 * | 1/2005 | Krissell ...................... 709/232 |
| 2005/0114432 A1 * | 5/2005 | Hodges et al. .............. 709/201 |
| 2005/0131962 A1 * | 6/2005 | Deshpande ................. 707/201 |

FOREIGN PATENT DOCUMENTS

WO     WO 01/27717 A     4/2001

* cited by examiner

*Primary Examiner*—Reginald G. Bragdon
*Assistant Examiner*—Aracelis Ruiz
(74) *Attorney, Agent, or Firm*—Blakely, Sokoloff, Taylor & Zafman LLP

(57) ABSTRACT

A system and method are described for providing dynamic mobile cache for mobile computing devices. In one embodiment, a cache is created at a server at the time a communication session between the server and a client is initiated. The server then determined whether the client requires the cache. If it is determined the client requires the cache, the server provides the cache to the client.

12 Claims, 6 Drawing Sheets

MOBILE ADAPTIVE CACHE

BACKGROUND

1. Field of the Invention

This invention relates generally to the field of mobile computing devices. More particularly, an embodiment relates to a system and method for employing mobile adaptive cache.

2. Description of the Related Art

Mobile computing devices (e.g., Personal Digital Assistants (PDAs) and phones) are becoming increasingly popular and important. Many distributed systems are using mobile computing devices as an integral part of their architecture. However, the performance of such mobile devices remains poor due to the limited resources of such devices in terms of the amount of memory, central processing unit (CPU) capacity, and network connectivity. One standard solution to the problem of reduced bandwidth is to deploy a cache near the location where the data is consumed, such as on the client device. Although this solution works well with desktop personal computers (PCs) and laptops, it is not a practical solution for smaller mobile devices, such as PalmPilots and smartphones.

For example, smaller mobile devices typically do not contain local hard drives and thus, having a cache on such devices require placing the cache on the main memory, which hinders performance by limiting the use and availability of the main memory and the CPU. Placing a cache at the main memory requires running complex algorithm and does not provide an efficient way for protecting the cache data if the connection is lost or the device crashes. Furthermore, starting a cache on a mobile device requires starting the cache empty (because cached data is not persistent across various communication sessions due to the lack of persistent storage, such as a hard drive), which results in the cache taking relatively long time to "fill up" with useful data. It is only after some time (e.g., "startup time") that the "hit rate" of the cache (e.g., proportion of requests that can be answered from the cache without having to contact the remote server) reaches a level at which the device's performance can be regarded as reasonable. None of the solutions available today provide enough cache on mobile devices "without sacrificing performance, bandwidth, and efficiency.

SUMMARY

A system and method are described for providing mobile adaptive cache for mobile computing devices. In one embodiment, a cache is created at a server at the time a communication session between the server and a client is initiated. The server then determined whether the client requires the cache. If it is determined by the server that the client requires the cache, the server provides the cache to the client for use with various tasks.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Figure 1:
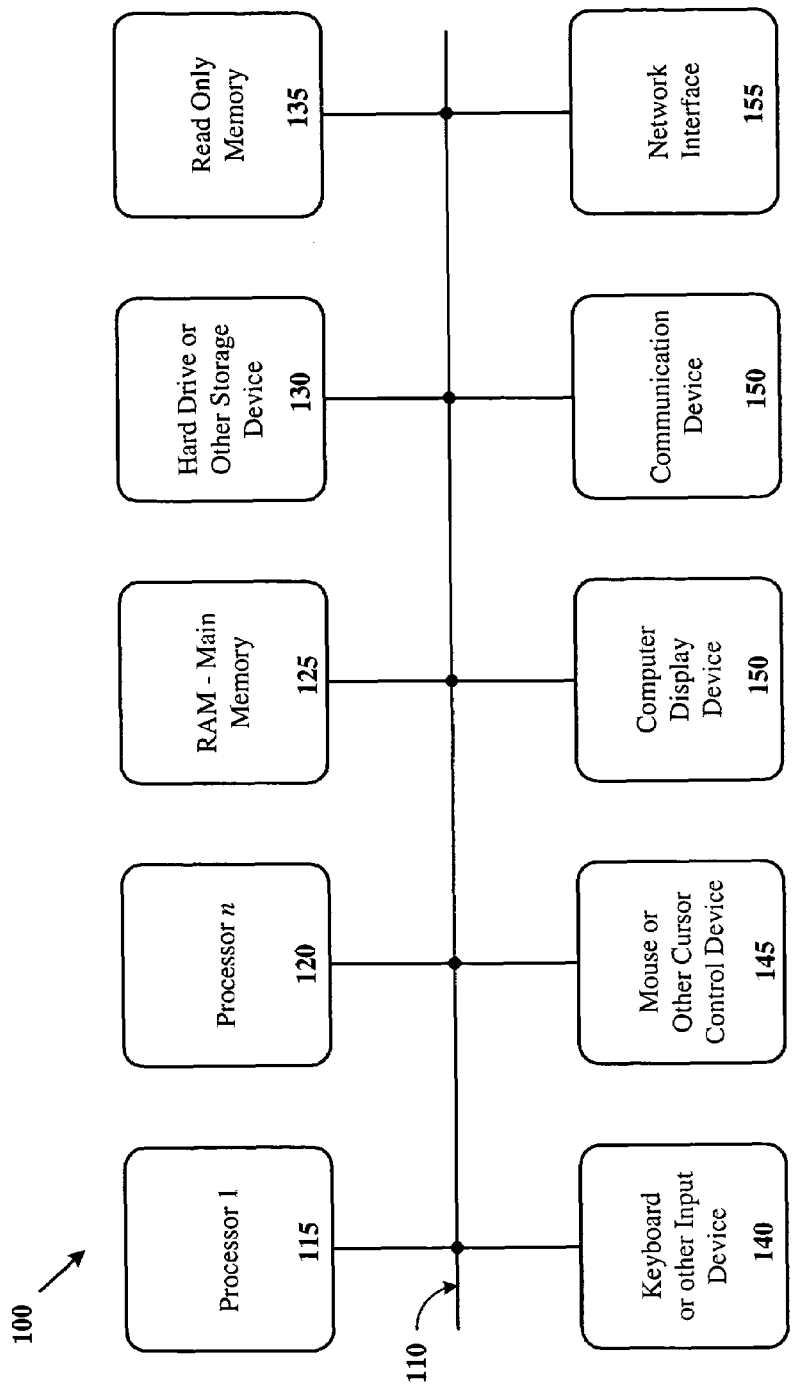
FIG. 1 is a block diagram illustrating an embodiment of an exemplary computer system.

Described below is a system and method for providing mobile adaptive cache for mobile computing devices. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

FIG. 1 is a block diagram illustrating an embodiment of an exemplary computer system (system) 100. In this illustration, a system 100 comprises a bus 110 or other means for communicating data. The system 100 includes one or more processors, illustrated as shown as processor 1 115 through processor n 120 to process information. The system 100 further comprises a random access memory (RAM) or other dynamic storage as a main memory 125 to store information and instructions to be executed by the processor 115 through 120. The RAM or other main memory 125 also may be used for storing temporary variables or other intermediate information during execution of instructions by the processors 115 through 120.

A hard drive or other storage device 130 may be used by the system 100 for storing information and instructions. The storage device 130 may include a magnetic disk or optical disc and its corresponding drive, flash memory or other nonvolatile memory, or other memory device. Such elements may be combined together or may be separate components. The system 100 may include a read only memory (ROM) 135 or other static storage device for storing static information and instructions for the processors 115 through 120.

A keyboard or other input device 140 may be coupled to the bus 110 for communicating information or command selections to the processors 115 through 120. The input device 140 may include a keyboard, a keypad, a touch-screen and stylus, a voice-activated system, or other input device, or combinations of such devices. The computer may further include a mouse or other cursor control device 145, which may be a mouse, a trackball, or cursor direction keys to communicate direction information and command selections to the processors and to control cursor movement on a display device. The system 100 may include a computer display device 150, such as a cathode ray tube (CRT), liquid crystal display (LCD), or other display technology, to display information to a user. In some environments, the display device may be a touch-screen that is also utilized as at least a part of an input device. In some environments, the computer display device 150 may be or may include an auditory device, such as a speaker for providing auditory information.

A communication device 150 may also be coupled to the bus 110. The communication device 150 may include a modem, a transceiver, a wireless modem, or other interface device. The system 100 may be linked to a network or to other device using via an interface 155, which may include links to the Internet, a local area network, or another environment. The system 100 may comprise a server that connects to multiple devices. In one embodiment the system 100 comprises a Java® compatible server that is connected to user devices and to external resources.

While the machine-readable medium 130 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 100 and that causes the machine to perform any one or more of the methodologies of the present invention. The term "machine-readable medium" shall accordingly be taken to include, but not be limited to, solid-state memories and optical and magnetic media.

Furthermore, it is appreciated that a lesser or more equipped computer system than the example described above may be desirable for certain implementations. Therefore, the configuration of system 100 may vary from implementation to implementation depending upon numerous factors, such as price constraints, performance requirements, technological improvements, and/or other circumstances.

It should be noted that, while the embodiments described herein may be performed under the control of a programmed processor, such as the processor 115, in alternative embodiments, the embodiments may be fully or partially implemented by any programmable or hardcoded logic, such as field programmable gate arrays (FPGAs), Transistor Transistor Logic (TTL), and application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

Figure 2:
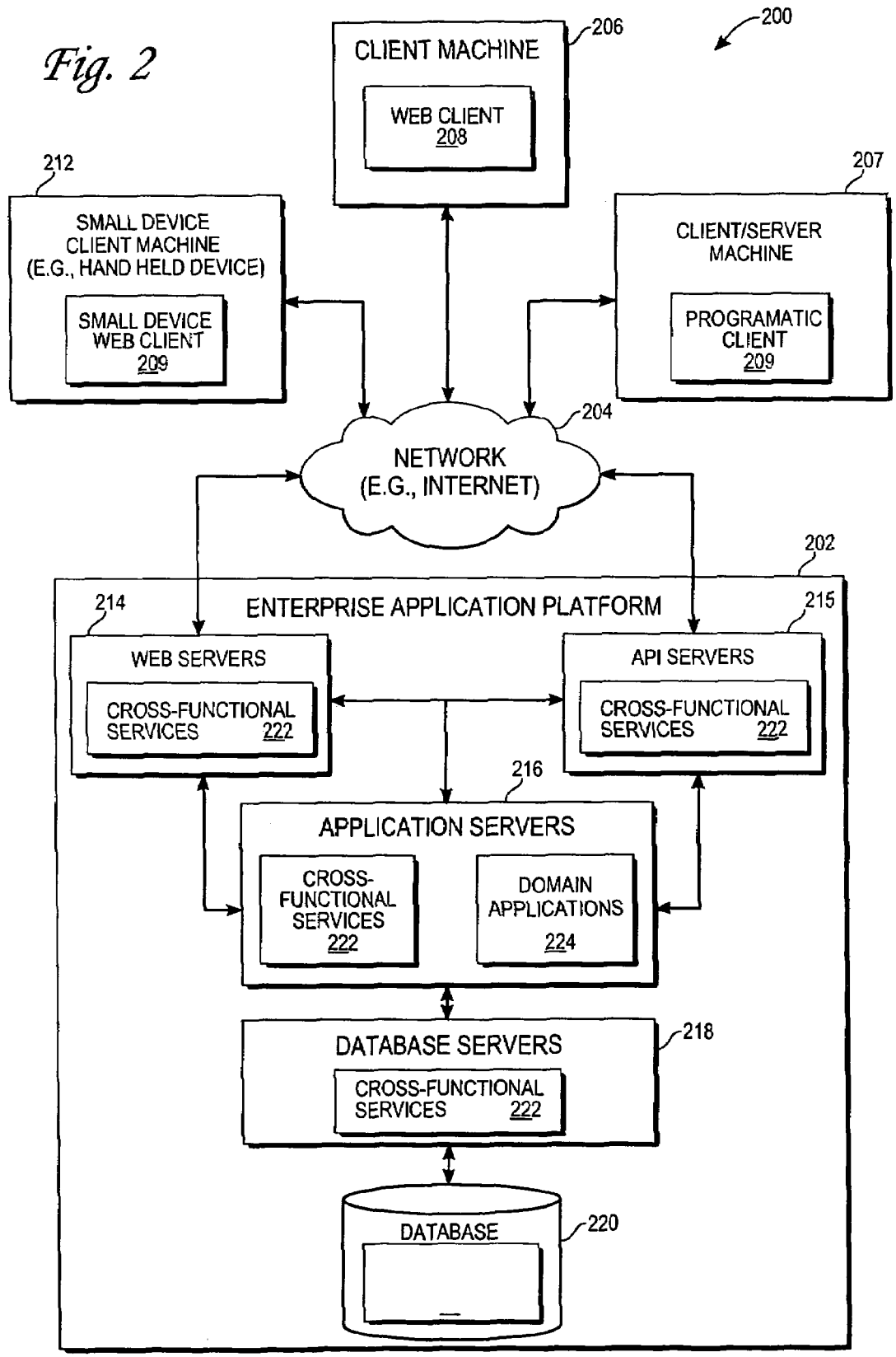
FIG. 2 is a block diagram illustrating a network having a system, according to one exemplary embodiment, having a client-server architecture.

FIG. 2 is a block diagram illustrating a network having a system 200, according to one exemplary embodiment, having a client-server architecture. A platform (e.g., machines and software), in the exemplary form of an enterprise application platform 202, provides server-side functionality, via a network 204 (e.g., the Internet) to one or more clients. FIG. 2 illustrates, for example, a client machine 206 with web client 208 (e.g., a browser, such as the Internet Explorer® browser developed by Microsoft® Corporation of Redmond, Wash. State), a small device client machine 212 with a small device web client 209 (e.g., a browser without a script engine) and a client/server machine 207 with a programmatic client 209. It is contemplated that the small device client machine 212 may also include a programmatic client, such as the programmatic client 209.

Turning specifically to the enterprise application platform 202, web servers 214, and Application Program Interface (API) servers 215 are coupled to, and provide web and programmatic interfaces to, application servers 216. The application servers 216 are, in turn, shown to be coupled to one or more databases servers 218 that facilitate access to one or more databases 220. The web servers 214, Application Program Interface (API) servers 215, application servers 216, and database servers 218 host cross-functional services 222. The application servers 216 further host domain applications 224.

The cross-functional services 222 provide services to users and processes that utilize the information enterprise application platform 202. For instance the cross-functional services 222 provide portal services (e.g., web front-end of an application server), database services and connectivity to the domain applications 224 for users that operate the client machine 206, the client/server machine 207 and the small device client machine 212. In addition, the cross-functional services 222 provide an environment for delivering enhancements to existing applications and for integrating third party and legacy applications with existing cross-functional services 222 and domain applications 224. Further, while the system 200 shown in FIG. 2 employs a client-server architecture, the present invention is of course not limited to such an architecture, and could equally well find application in a distributed, or peer-to-peer, architecture system.

Figure 3:
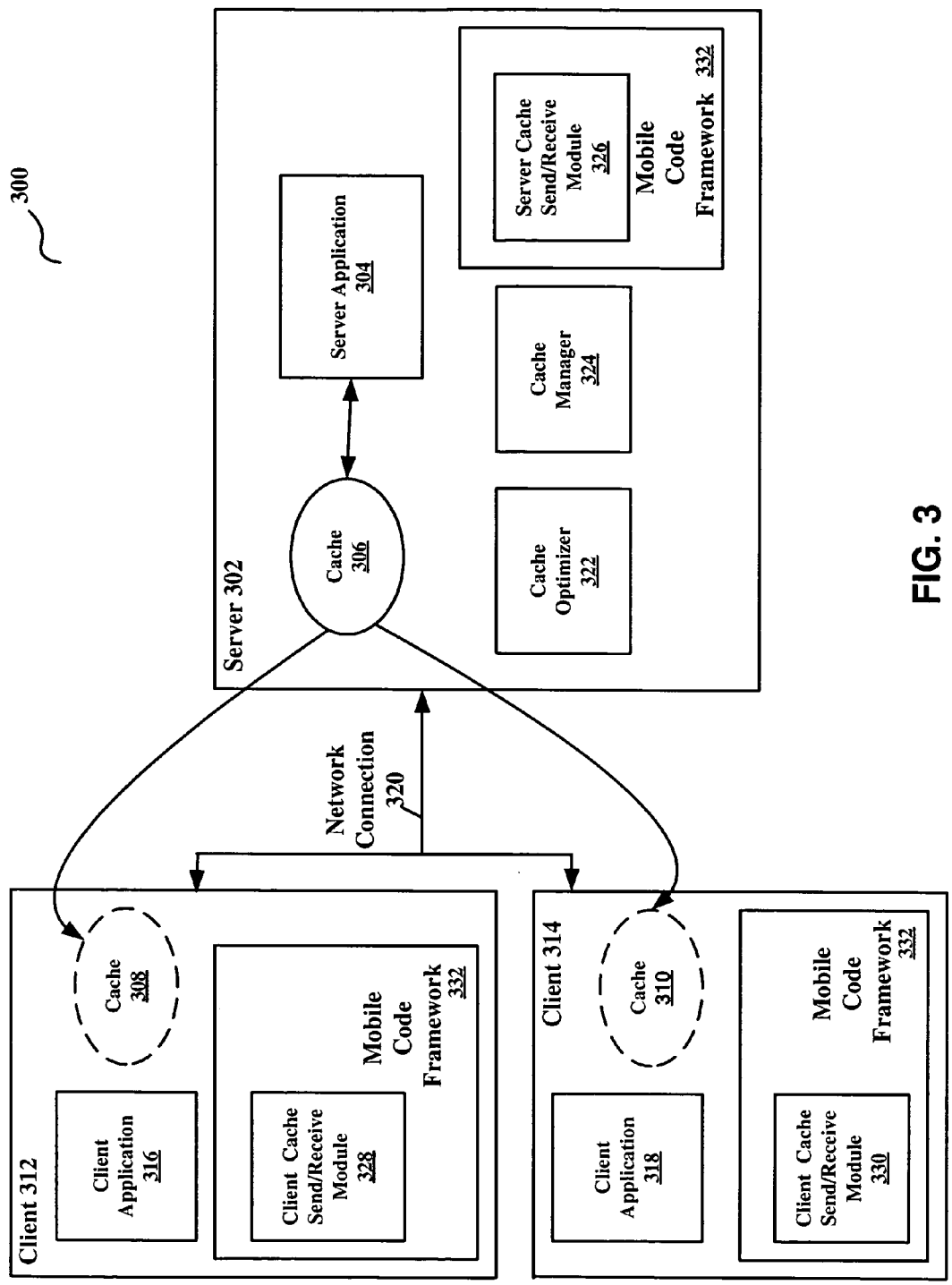
FIG. 3 is a block diagram illustrating an embodiment of network employing a mobile adaptive cache.

FIG. 3 is a block diagram illustrating an embodiment of network 300 employing a mobile adaptive cache 306. In the illustrated embodiment, the network 300 includes a server machine (server) 302 having a server application 304. The server 302 refers to a piece of hardware capable of running an application 304 that can be accessed by other components, such as client machines (clients) 312-314, within the network 300. For example, a PC running a Tomcat servlet server, under Linux, and connected to the Internet via a digital subscriber line (DSL). The server application 304 refers to a program running on a server 302 to provide various functionalities to a client application 316-318 residing at the client 312-314. A company-wide employee directory is an example of a server application 304. Here, the server 302 is remotely located and is in communication with various clients 312-314 via a network connection 320.

Each of the clients 312-314 includes a client application 316-318. In one embodiment, the clients 312-314 may include mobile computing devices (mobile devices), such as PDAs, phones, and other mobile computer systems. A mobile device 312-314 refers to a piece of hardware capable of running applications 316-318 and communicating with a remote server 302 over a network 300. For example, a Hewlett Packard (HP) iPAQ PDA running Windows CE with WiFi connectivity, or mobile phones running Java applications and connecting to remote application servers using a Global System for Mobile Communications (GSM) or General Packet Radio Service (GPRS). A client application 316-318 refers to a program running on the client 312-314 to connect with the server application 304 to retrieve and consume information at the server application 304 by issuing requests to the server 302 and, in return, receiving replies from the server 302.

In one embodiment, a mobile adaptive cache (cache) 306 is created on the server 302 at the time a communication session is first initiated between the server 302 and one of the clients 312-314. The mobile cache 306 refers to a program situated between the clients 312-314 and the server application 304 that stores the result of requests from the clients 312-314 and answers given in reply to such requests. It is contemplated that another level of cache may exist on the server 302 to store such results and answers in order to quickly reply to subsequent, but familiar, requests from the clients 312-314. In one embodiment, the mobility of the cache 306 refers to moving both the cache content or data and the cache code or program that is used to manage the cache content between the clients 312-314 and the server 302. The mobility of the cache content and cache code is performed without disturbing the execution of the distributed or client applications 316-318. The cache 306 fills up as requests and replies are exchanged between the clients 312-314 and the server 302. The server 302 then chooses a caching strategy in order to maximize the hit rate of the cache 306.

When the cache 306 is tuned enough, the cache 306, having the cache content and the cache code, is moved to the clients 312-314 where it resumes running. Tuning up of the cache 306 refers to the server determining prior to sending the cache 306 to the client 312-314 whether a predetermined set of threshold requirements is met. The threshold may be based on a variety of factors, such as network capabilities and limitations, system capabilities and limitations, history of the clients 312-314 with regard to accessing the cache 306, and the like.

Upon initiation of the first communication session between a client 312-314 and the server 302, the tuning up of the cache 306 helps reduce the cache startup time, because, for example, the cache 306 is tuned up on the server 302, where greater resources are available for tuning up compared to the limited resources available on the client 312-314. Further, by having the cache 306 tuned up on the server 302, the clients 312-314 are not negatively impacted by penalties (e.g., slow- down) commonly relating to the startup time. Stated differently, not only the startup time is reduced by performing the tune up of the cache 306 on the server 302, but also the usual penalty associated with the startup time to the client 312-314 is eliminated. Upon initiation of subsequent sessions, the startup time for such new sessions may be removed as the cache 306 is already tuned up and waiting on the server 302 for the client 312-314 to initiate a new communication session. It is contemplated that instead of hosting and tuning up the cache 306 on the server 302, such tasks can be performed on a separate proxy server in communication with the server 302 and the client 312-314.

Furthermore, the cache content is made persistent between sessions by carefully transferring the cache 306 between the server 302 and the clients 312-314. When transferring the cache 306, both the cache content and the cache code are transferred. In one embodiment, a software module on the server 302 may be used to indicate to the server 302 when the clients 312-314 require the cache 306. This can be achieved using a mobile code framework 330 that helps provide transparent migration of the cache code and content between the server 302 and the clients 312-314. The mobile code framework may include one or more send/receive modules residing at the server 302 and the clients 312-314 to help perform the transferring of the cache content and code between the server 302 and the client 312-314.

In another embodiment, the cache 306 is transferred to the clients 312-314 in response to a request from the clients 312-314 placed with the server 302. For example, before the communication session is terminated between the client 312 and the server 302, the cache 308 (including the cache content and the cache code) is moved back to the server 302, where it keeps running while the client 312 being disconnected. Furthermore, the cache content is kept updated by having the server 302 stay aware of any cache update events that may occur. For example, the server 302 is made aware of a cache update event with regard to the cache 308 at the client 312. The server 302 then provides the update information to the cache 306 to inform the cache 306 that an update of data has occurred at the cache 308, and to instruct the cache 306 to accordingly modify its content. Thus, when the client 312 reconnects at a later time, the client 312 receives a well-tuned and updated cache 306 that includes updated content from the previous session. The transferring of the cache 306-310 may be performed using a migration mechanism that is based on the mobile code framework 332 being used. Further, the sending and receiving of the cache 306 is performed using a server cache send/receive module 326, which is part of the mobile code framework 332, residing at the server 302. Similarly, the sending and receiving of the cache 308-310 is performed using client cache send/receive modules 328-330, also part of the mobile code framework 332, residing at each of the clients 312-314.

In one embodiment, each cache 306-310 includes cache content (e.g., data) and a cache code (e.g., program). The code, for example, may be responsible for managing the content of the cache 306-310. When the cache 306 is moved from the server 302 to one or more of the clients 312-314 (e.g., cache 308-310) and then moved back to the server 302, such mobility of the cache 306 allows the movement of the entire cache 306 (e.g., cache application), which including the cache content and the cache code. Such mobility of the cache content and the cache code helps facilitate the dynamic installation of the cache 306 on the clients 312-314 (as cache 308-310), even without the client applications 316-318 having any prior notion of the cache 308-310. The mobile cache 306 can be used for improving the performance of both the resource-constrained data consumers (e.g., clients 312-314) and the resource-constrained data producers (e.g., server 302). An example of resource-constrained clients 312-314 includes a PDA or a mobile phone with a wireless connection or dial-up connection to the Internet.

Moreover, a personalized caching code is provided for improved performance and better utilization of the cache 306. For example, a number of caching strategies are employed on the server 302 to help the server 302 choose the best caching strategy for the each of the clients 312-314 when seeking the cache 306. The server 302, for example, may choose to send the cache 306 to the clients 312-314 when it has determined a caching strategy that yields a suitable hit rate for that particular client 312-314. Various caching strategies may be based on a predetermined set of threshold (e.g., hit rate) and/or it may be accumulated by maintaining a history of the clients 312-314 and their use of the cache 308-310. For example, a cache optimizer module (cache optimizer) 322 may be used on the server 302 to help maintain history. The cache optimizer 322 may be triggered each time the cache 306 is accessed to determine the current state of the cache 306 and the clients 312-314 seeking the cache 306, the history of the clients 312-314 seeking the cache 306, the history and nature of the task to be performed, and the like. Such information may then be used by the server 302 to choose the best caching strategy for each of the clients 312-314 when seeking the cache 306.

In one embodiment, to provide additional efficiency, security, and increased performance, a cache mobility manager module (cache manager) 324 may be used at the server 302. The cache manager 324 is used to evaluate several other factors to determine the amount of cache 306 ought to be transferred to a client 312-314. Such factors include cache hit rate, pattern of requests and replies between the server 302 and the client 312-314, speed between the server 302 and the clients 312-314, network limitations, and the type and amount of resources available on the clients 312-314 for hosting the cache 306, and the like. In some cases, such as when network resources are insufficient, the server 302 may decide to not send the cache 306. However, the request for the cache 306 may still be registered with the server 302 so that the cache 306 can be sent to the client 312-314 at a later time. Using components and modules like the cache manager 324 and the cache optimizer 322, the cache mobility between the server 302 and the clients 312-314 is not only facilitated, but also performed with efficiency, higher performance, and security.

Furthermore, personalization of the cache 306 can be performed at a user level. For example, a user accesses a particular application or database (e.g., employee timesheets) on the remote server 302 via the client 312 (e.g., laptop) using the cache 308. When initially accessing the database, the user uses a username and/or password, which is recognized and validated by the server 302 via the client 312. After completing a task, such as updating the database (e.g., changes made to an employee timesheet), the user logs off. Once the user has logged off, the cache 308 is sent back to the server 302 to reside as cache 306. In the process of sending the cache 308 back to the server 302, both the cache content and the cache code are transferred back to the server 302 and thus, preserving the updates or changes made to the database by the user. Now, the user accesses the same database via another client 314 (e.g., PDA) using the same username and password. The user is recognized and validated by the server 302, which sends the cache 306 to the client 314 as the cache 310. The cache 310 includes cache code and the updated cache content having the changes and updates made by the user at the client 312 using the cache 308. By preserving the cache content in-between the two sessions (first with the client 312 and second with the client 314), the user gets the benefit of a cache 310 tuned to the usage of the server 302 despite moving the cache 306 between the server 302 and the clients 312-314.

Figure 4:
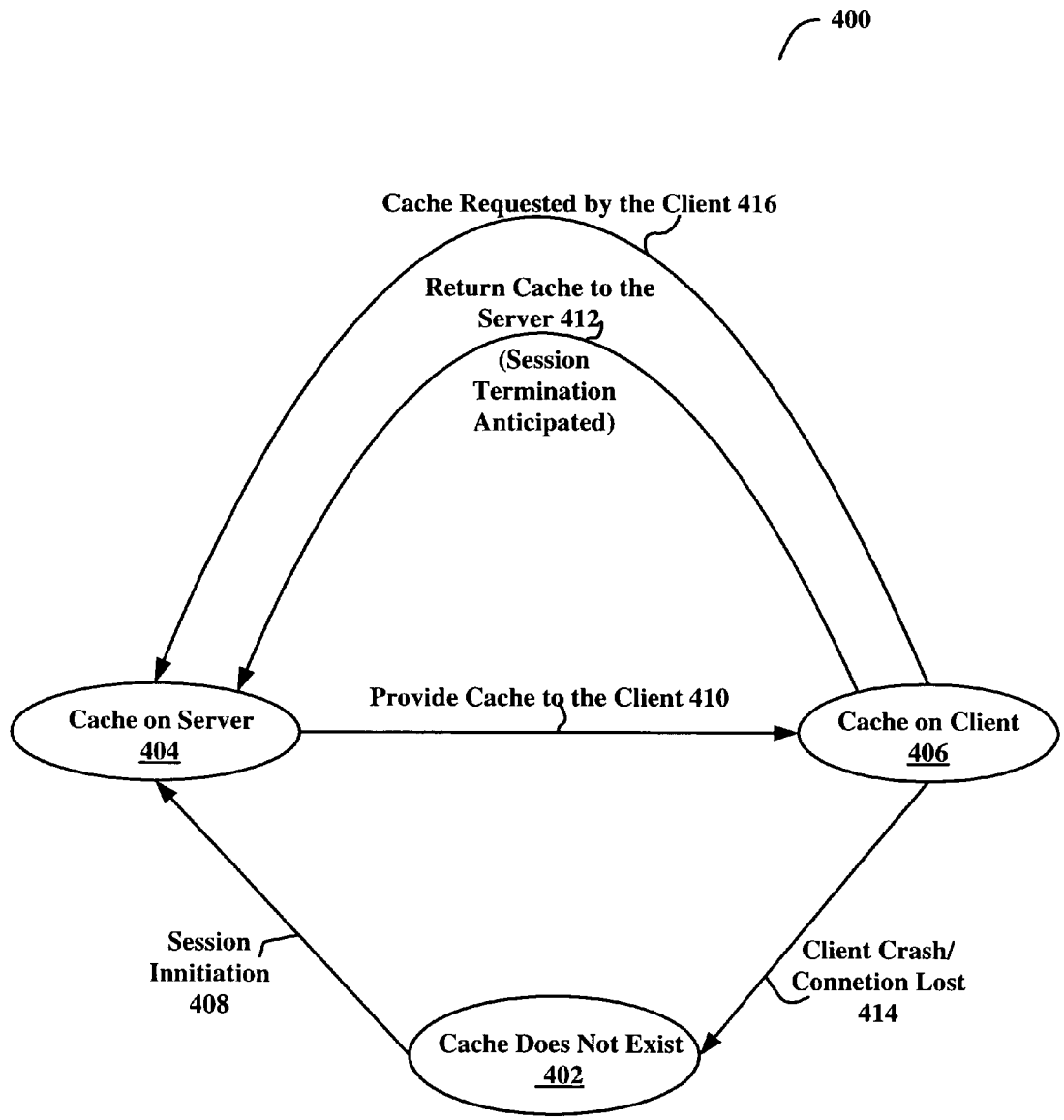
FIG. 4 is a block diagram illustrating an embodiment of a lifecycle within a network employing a mobile adaptive cache.

FIG. 4 is a block diagram illustrating an embodiment of a lifecycle 400 within a network employing a mobile adaptive cache. At first, a cache may not exist 402. When a client initiates a session 408 with a remote server by contacting the server at a known address, the cache is created on the server, which indicates the transition of the lifecycle 400 to the state of cache on server 404 from the state cache does not exist 402. The cache generated at the server may include a local session-specific cache. The server connects the "consumer" end of the cache to the "provider" end of the server application that implements various application functionalities. The server returns to the client the address of the provider end of the cache object.

In one embodiment, the cache resides at the server until one of the two events occurs. First, the server senses that the client requires the cache for performing one or more tasks. This is triggered when the client issues one or more requests to the server, which generates one or more replies back to the client. For example, the client issues a request to the server when attempting to load a web page, while the actual loading the web page represents generating a reply back to the client from the server. The server determining that the client has loaded the web page and is likely to reload the web page, it tunes up the cache for the client receive and have so that next time, the web page is loaded and/or re-loaded by accessing the cache residing at the client. Stated differently, the server determines the need for the client to have a local cache and provides the cache to the client 410 once the threshold of cache mobility, as discussed with reference to FIG. 3, has been met. This moves the lifecycle 400 from the state of cache on server 404 to the state of cache on client 406.

Second, the server provides the cache to the client 410 in response to the client requesting the cache 416. When compared to the server, it is contemplated that the client may know sooner and have a better knowledge of the task it is going to perform. Thus, in some cases, the client issues a request for the cache 416 to the server without waiting for the server to determine the client's need for the cache. The server complies with the request 416 and provides the cache 410 to the client.

As discussed with reference to FIG. 3, each time the cache on the server is needed by a client, the cache optimizer is notified. The cache optimizer may then review the history of the client and determine various other factors to implement the best cache management strategy for moving the cache from the server to the client. The cache manager is used to evaluate numerous factors and patterns to determine whether and when to appropriately transfer the cache to the client and transform the cache on server state 404 to the cache on client state 406.

At some point, the client seeks to close the connection with the server. However, before terminating the session (including when anticipating a potential crash), the client moves back the cache (including its content and code) to the server 410 for preservation of changes to the content of the cache. The keeping of the content of the cache updated may also include updating the cache code, which is also preserved at the server. The moving back 416 of the cache to the server transforms the cache on client state 406 to the cache on server state 404. When the client reconnects with the server to initiate another session, the client receives back the cache (including the updated cache content and code) being preserved on the server. Furthermore, a user properly identified by the server may receive the updated cache when accessing the same application or database as previously accessed by the user even when accessing via different client than previously used. In cases when the client crashes or the connection is lost 414 without the client having anticipated the crash or the loss of connection 414, the cache may be lost and may no longer exist 402.

Figure 5:
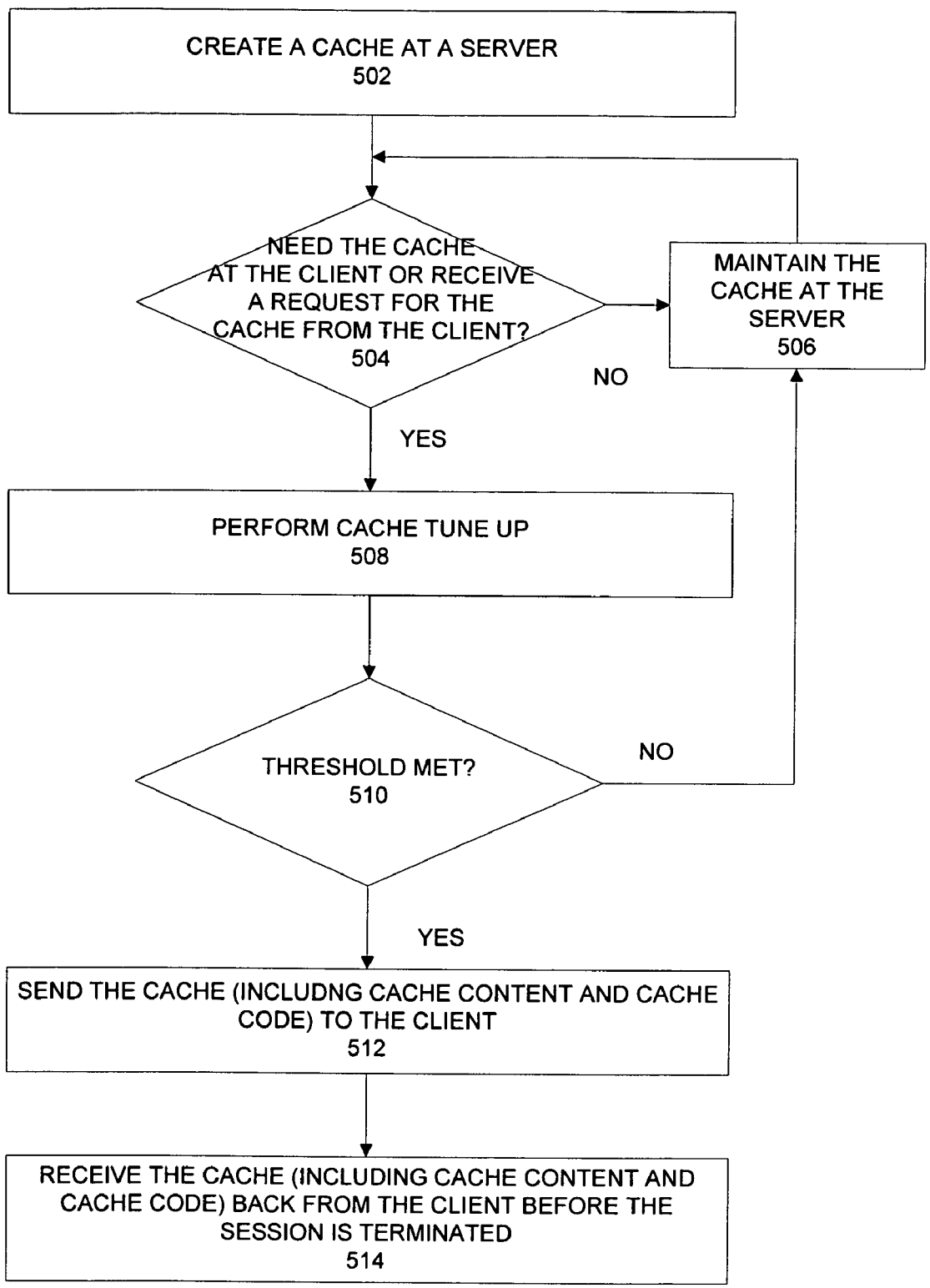
FIG. 5 is a flow diagram illustrating a process for dynamically transferring a mobile adaptive cache between a server and a client device.

FIG. 5 is a flow diagram illustrating a process for moving a mobile adaptive cache between a server and a client. First, a cache is created at the server when a communication session between the client and the server is initiated at processing block 502. At decision block 504, a determination is made by the server as to whether the client requires the cache or whether a request for the cache is received from the client. If not, the cache resides at the server 506 until the client requires the cache or a request is received from the client. If, however, the server determines that the client is in need for the cache or if the server receives a request from the client requesting the cache, the cache tuned up by the server at processing block 508. The process of tuning-up the cache includes using the cache manager and cache optimizer to evaluate various factors relating to the network, the client, and transferring of the cache to the client and the timing of such, before the cache can be sent to the client.

Once the necessary factors are evaluated, at decision block 510, a determination is made as to whether the necessary threshold is met for sending the cache from the server to the client. If the threshold is not met, the cache is not sent to the client and is continued to be maintained at the server at processing block 506. The process then continues with decision block 504. If the threshold is met, the cache is sent to the client at processing block 512. The cache includes the cache content and the cache code. The cache from the client is then received back at the server before the session between the client and the server is terminated at processing block 514.

Figure 6:
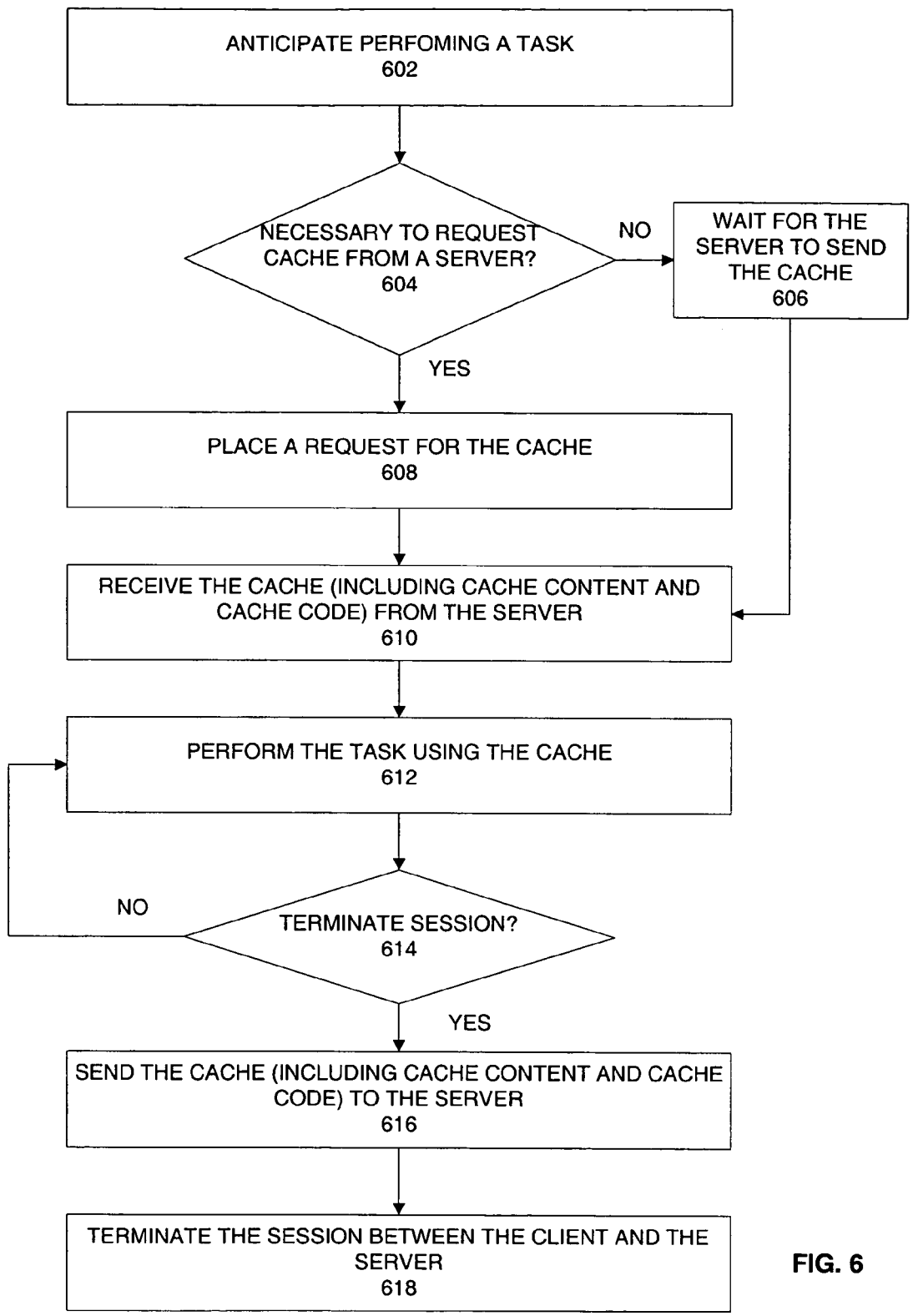
FIG. 6 is a flow diagram illustrating a process for dynamically transferring a mobile adaptive cache between a server and a client device.

FIG. 6 is a flow diagram illustrating a process for moving a mobile adaptive cache between a server and a client. A client anticipates performing a task and requires cache for it at processing block 602. The client determines whether to request the cache from the server at decision block 604. If the request is not made, the client waits for the server to notice the client's need for the cache at processing block 606. The cache having the cache content and the cache code is received at the client from the server at processing block 610. If there is a need for the request to be made, the client places the request for the cache with the server at processing block 608. The cache is then received at the client in response to the request placed with the server at processing block 610. The client may then perform the task using the cache received at processing bock 612.

At decision block 614, a determination is made as to whether the session is about to end or the connection is to be terminated. If session is to continue, the client may continue to perform the task at processing block 612. At processing block 616, if the session is to be terminated, the cache content and the cache code are transferred back to the server for storage for future use. The cache content and the cache code may include updates made at the client during the session and these updates are preserved at the server for use during subsequent sessions. At processing block 618, the session between the client and the server ends.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:
   initiating a first session between a server and a client;
   creating a cache at the server in response to the first session being initiated between the server and the client;
   maintaining the cache at the server until one or more factors to move the cache to the client are satisfied;
   determining whether the one or more factors are satisfied;
   moving the cache to the client if the one or more factors are satisfied;
   recapturing the cache at the server prior to ending of the first session;
   updating the cache at the server while the client is disconnected from the server;
   initiating a second session between the server and the client;
   re-determining whether the one or more factors are satisfied upon reconnection of the client to the server for the second session; and
   moving the updated cache to the client if the one or more factors are satisfied, the updated cache including the cache from the first session.

2. The method of claim 1, wherein the one or more factors comprises one or more of the client requesting the cache, pattern of communication between the client and the server, frequency at which the client and the server communicate, available resources of the client, system capabilities of the client, past performance of the client, current performance of the client, and nature of current tasks being performed by the client.

3. The method of claim 1, wherein the maintaining of the cache at the server comprises observing the communication between the client and the server to update the cache at the server according to observing of the communication, prior to moving the cache to the client.

4. The method of claim 3, wherein the communication between the client and the server comprises one or more of receiving requests at the server from the client, and sending replies from the server to the client in response to the requests received.

5. A system comprising:
a client to initiate a first session with a server; and
the server coupled to the client, the server to
create a cache in response to the session being initiated between the server and the client,
maintain the cache at the server until one or more factors to move the cache to the client are satisfied,
determine whether the one or more factors are satisfied,
move the cache to the client if the one or more factors are satisfied,
recapture the cache at the server prior to ending of the first session,
update the cache at the server while the client is disconnected from the server,
initiate a second session between the server and the client,
re-determine whether the one or more factors are satisfied upon
reconnection of the client to the server for the second session, and move the updated cache to the client if the one or more factors are satisfied, the updated cache including the cache from the first session.

6. The system of claim 5, wherein the one or more factors comprise one or more of the client requesting the cache, pattern of communication between the client and the server, frequency at which the client and the server communicate, available resources of the client, system capabilities of the client, past performance of the client, current performance of the client, and nature of the current tasks being performed by the client.

7. The system of claim 5, wherein the client comprises a mobile computing system including one or more of a laptop computer, a pocket computer, a personal digital assistant (PDA), and a telephone.

8. The system of claim 5, wherein the server is further to observe the communication between the client and the server to update the cache at the server according to the observing of the communication, prior to moving the cache to the client.

9. A machine-readable storage medium having instructions which, when executed, cause a machine to:
initiate a session between a server and a client;
create a cache at the server in response to the session being initiated between the server and the client;
maintain the cache at the server until one or more factors to move the cache to the client are satisfied;
determine whether the one or more factors are satisfied;
move the cache to the client if the one or more factors are satisfied;
recapture the cache at the server prior to ending of the first session;
update the cache at the server while the client is disconnected from the server;
initiate a second session between the server and the client;
re-determine whether the one or more factors are satisfied upon reconnection of the client to the server for the second session; and
move the updated cache to the client if the one or more factors are satisfied, the updated cache including the cache from the first session.

10. The machine-readable storage medium of claim 9, wherein the one or more factors comprise one or more of the client requesting the cache, pattern of communication between the client and the server, frequency at which the client and the server communicate, available resources of the client, system capabilities of the client, past performance of the client, current performance of the client, and nature of the current tasks being performed by the client.

11. The machine-readable storage medium of claim 9, wherein the instructions when executed to maintain the cache at the server, further cause the machine to observe the communication between the client and the server to update the cache at the server according to the observing of the communication, prior to moving the cache to the client.

12. The machine-readable storage medium of claim 11, wherein the communication between the client and the server comprises one or more of receiving requests from the client at the server, and sending replies from the server to the client in response to the requests received.

* * * * *